Patented Feb. 2, 1943

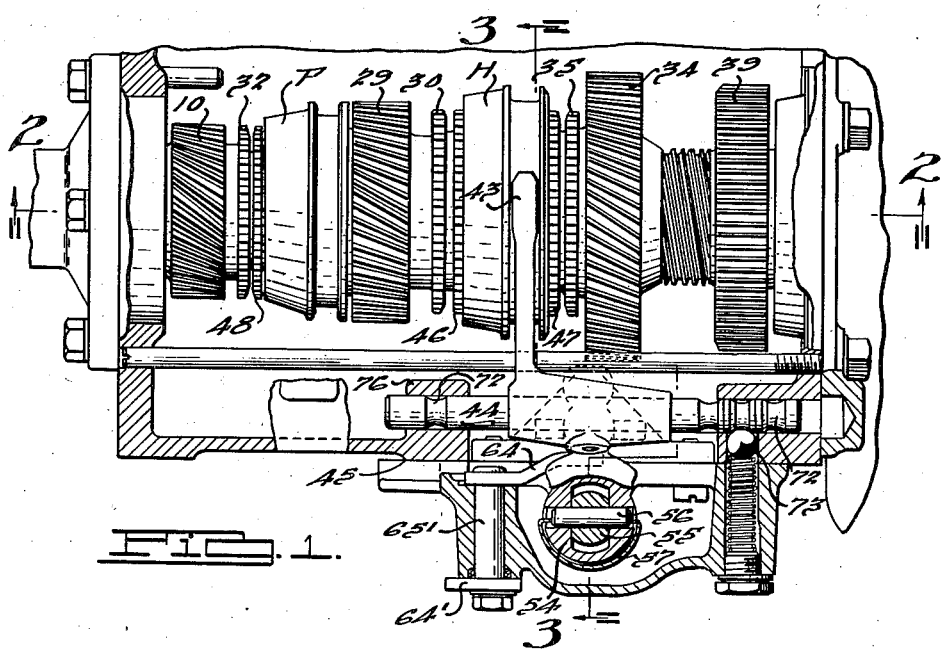

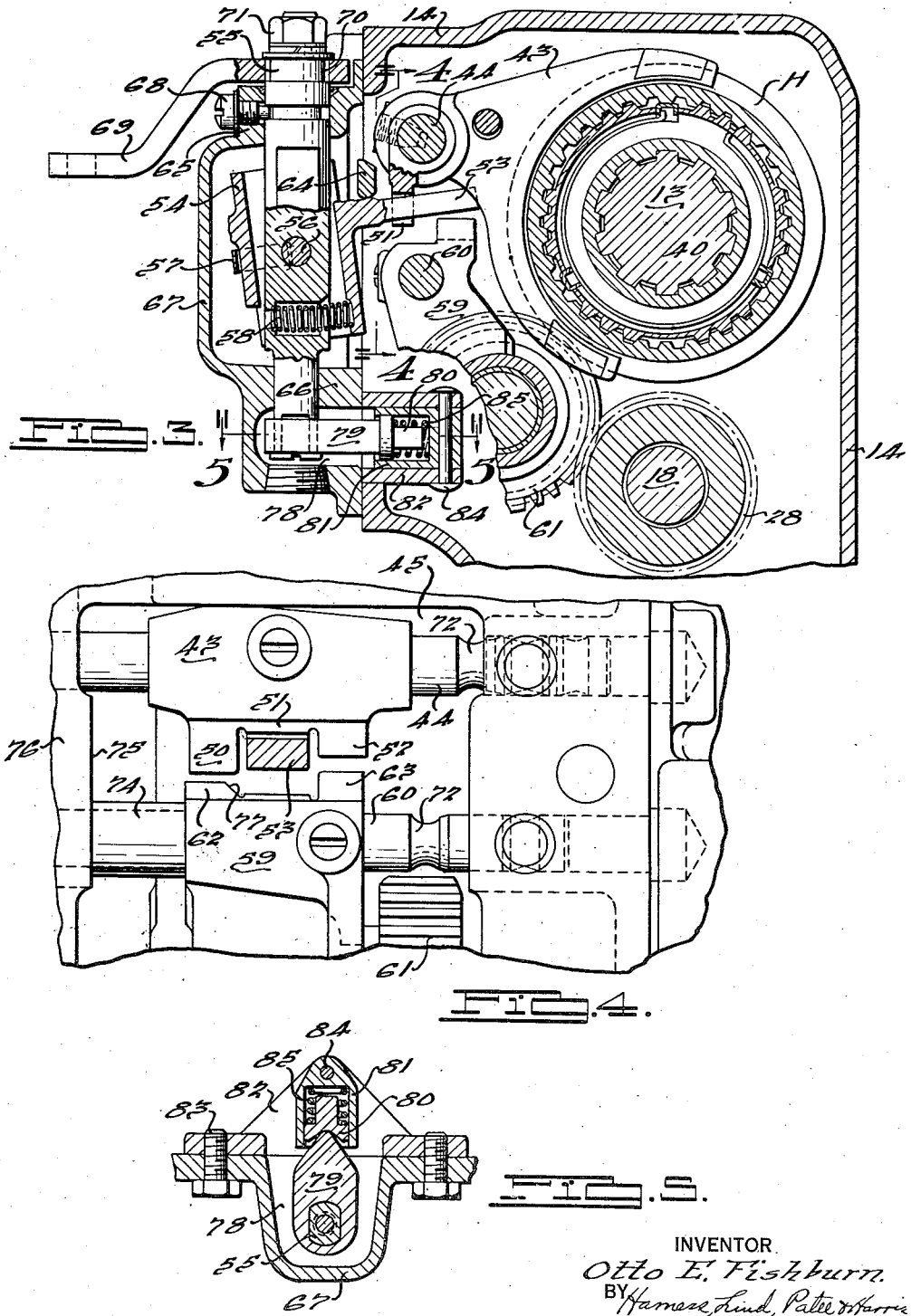

2,309,837

UNITED STATES PATENT OFFICE 2,309,837

TRANSMISSION SHIFT MECHANISM

Otto E. Fishburn, Detroit, Mich., assignor to Chrysler Corporation, Highland Park, Mich., a corporation of Delaware Application October 11, 1940, Serial No. 360,733

4 Claims. (Cl. 74—475)

This invention relates to automobile transmission mechanism in general and particularly to improved shifting means therefor.

In transmissions of the semi-automatic type, such as that disclosed and claimed in the co-pending application of Carl A. Neracher et al., Serial No. 335,310, filed May 15, 1940, only three shifted positions of the hand actuated shift lever are provided instead of the usual four positions. These positions are usually arranged so that high and low range speed ratio settings may be obtained by manipulation of the lever in a lower path of movement, and reverse drive setting is obtained by movement of the lever in an upper path of movement. Because there are only two forward speed ratio settings, movement of the shift lever out of reverse position and into a forward position requires that the lever be dropped from the upper to the lower path of movement. This is disconcerting to drivers who have become accustomed to the conventional three speed and reverse shift, wherein the lowest forward speed is obtained by backward movement of the shift lever in its upper path of movement, and in situations where rapid shifting between reverse and forward speeds is required, difficulty is experienced because of the tendency to hold the shift lever in the upper path. If this is done, the lever will dead-end in the neutral zone and no forward speed will be obtained until the lever is dropped into its lower path of movement.

It is therefore the main object of the present invention to provide improved shifting mechanism, for transmissions of the aforesaid type whereby the above described difficulty is eliminated and, in addition, the shift is rendered much smoother and more rapid than before.

A further object is to provide improved booster mechanism for transmission shift mechanisms of the rockshaft type whereby the manual effort necessary to operate the transmission synchronizing mechanism is substantially reduced.

Additional features of my invention are found in the provision of many features of improved construction and functional operation which will become apparent from the following illustrative embodiment of my invention, reference being had to the accompanying drawings in which:

Fig. 1 is a plan view of a transmission mechanism of the semi-automatic type, certain parts being shown in section.

Fig. 2 is a longitudinal elevational sectional view taken along the line 2—2 of Fig. 1.

Fig. 3 is an elevational sectional view taken along the line 3—3 of Fig. 1.

Fig. 4 is an elevational view taken approximately along the line 4—4 of Fig. 3.

Fig. 5 is a sectional view taken along the line 5—5 of Fig. 3.

In the drawings in which reference characters are used to designate corresponding parts referred to in the following description, 10 designates the main drive pinion of the mechanism, said pinion being formed integrally at the rearward end of the input shaft 11 which is intended to be driven by the vehicle engine through the usual clutch mechanism (not shown). The drive pinion 10 is hollow and journals, by a bearing 12, the forward end of the transmission driven shaft 13 which is designed to be connected to a propeller shaft (not shown) for driving the vehicle. The drive pinion 10 is continuously meshed with a gear 16 for driving the countershaft cluster 17 which is rotatable on countershaft 18. The cluster 17 has a forward extension 19 journalled at 20 within gear 16 and between these parts 19 and 16, there is provided an overrunning clutch G. The usual speedometer driving worm is shown at 15 fixed to the shaft 13 for driving the usual speedometer cable.

The clutch G comprises a driving cylindrical clutching member 21 formed within gear 16 and an inner driven cammed member 22 formed on extension 19. Rollers 23 are disposed between clutch members 21 and 22 such that these rollers are wedged to clutch these members together when the gear 16 tends to rotate faster than extension 19 in the forward direction of the drive of the car while allowing the extension 19 to freely overrun gear 16. Assuming the usual clockwise direction of driving shaft 11 in looking from front to the rear of the car, clutch G engages when gear 16 tends to rotate faster than extension 19. A cage 24 positions the rollers 23 in proper spacing, a spring 25 yieldingly urging the rollers in the direction of their engagement as is customary in overrunning clutches.

The cluster 17 is further formed with reduction gears 26 and 27 and reverse gear 28, that is, three countershaft gears being of relatively decreasing diameter in the order mentioned. Gear 26 is in constant mesh with the gear 29 which is journalled on the driven shaft 13. The gear 29 has a forward extension carrying a set of external driven teeth slidably fitting internal clutch teeth of a synchronous coupling sleeve F so that this sleeve is, as will be presently more apparent, adapted to turn with the transmission driven shaft 13 but may slide forwardly from its Fig. 2 position relatively to the driven shaft. Gear 29 has a rearward extension formed with a set of clutch teeth 30 and a friction cone clutch member 31, and drive pinion 10 also has a rearward extension formed with a set of external clutch teeth 32 and a friction cone clutch member 33.

The gear 27 is constantly meshed with a low speed gear 34 freely journalled on driven shaft 13 and having a forward extension formed with clutch teeth 35 and a cone clutch member 36. The reverse gear 28 is adapted to mesh with a reverse idler gear (not shown) when the said idler gear is shifted into mesh with the gear 39 fixed on the driven shaft 13.

The arrangement is such that shaft 13 may be selectively clutched at the will of the driver with gears 29 and 34, the control preferably comprising a manually actuated remote shift mechanism of any suitable type and construction. The operation of the clutch sleeve F is, on the other hand, adapted to be shifted by power actuated means and is automatic in its operation of clutching driving shaft 11 with gear 29 for connecting these parts. The manually actuated clutching control comprises the following mechanism.

Fixed to the driven shaft 13 is a hub 40 formed with external teeth 41 slidably engaged with the internal teeth 42 of a shiftable clutch sleeve H which is adapted for forward and rearward shift by means of a fork 43 (Figs. 1 and 3) which is fixed to a longitudinally extending shift rail 44 disposed to one side of the shaft 13 adjacent the side opening 45 of casing 14.

Synchronizing blocker rings 46 and 47 are respectively disposed between gears 29, 34 and hub 40, these rings engaging said hub with slight clearance. These blocker rings are provided with the usual cam teeth having a pitch circle the same as that of the sleeve teeth 42 and teeth 35 respectively and they are adapted to frictionally engage the clutching members 31 and 36 respectively so that the blocker teeth are misaligned with the sleeve teeth thereby preventing shift of the clutch and rotating at different speeds. The synchronizing blocker rings are more fully described in the claims in the copending application of Otto E. Fishburn, Serial No. 180,840, filed December 20, 1937.

When the sleeve H is moved forwardly and the teeth 41 thereof engage the cammed ends of the blocker teeth, thereby urging the blocker member under pressure engagement with cone 31 to synchronize gear 29 with shaft 13, the blocker 46 will rotate slightly relative to the hub 40 to permit the sleeve teeth 42 to pass through the teeth of the blocker member and thereby engage the teeth 30 to positively clutch the shaft 13 with gear 29. Rearward shift of sleeve H clutches teeth 42 with teeth 35 of gear 34 and is effected in a similar manner. When the sleeve H is engaged with the clutch teeth 35, the shaft 13 is driven at the speed of the gear 34 which is in turn driven by the gear 27. The gear 27 is driven from the shaft 11 at a speed ratio relative to the shaft 11 which depends upon the position of the sleeve F. When the sleeve F is in the position shown in Figs. 1 and 2, the countershaft cluster 17 is driven from the shaft 11 through gears 10 and 16, the overrunning clutch G acting to drive the cluster 17 at the speed of gear 16. When sleeve F is shifted forwardly to engage the teeth thereof with clutch teeth 32 formed on the rearward portion of the shaft 11 (which operation is accomplished under synchronous control of a blocker element 48 which blocks shift of the sleeve F except when shafts 13 and 11 are rotating at substantially synchronous speed), the countershaft cluster is driven by means of gears 29 and 26, the gear 29 under such conditions being directly clutched to shaft 11.

From the mechanism so far described then, it will be understood that four forward driving ratios are possible depending upon the relative positions of the sleeves F and H. In the ordinary operation of a vehicle embodying the present transmission, the operator shifts sleeve H manually to obtain either low range or high range speed ratio setting thereof and sleeve F is ordinarily shifted in response to various control instrumentalities to provide high and low speed ratios for driving the vehicle when the sleeve H is positioned in either high range or low range position. For further details and a fuller explanation of the operation of the automatic phase of the transmission, reference is made to the aforesaid Neracher et al. application.

The yoke 43 is provided with a boss 51 having a slot provided by lugs 50 and 52 which is adapted to be engaged by an inwardly extending shift finger 53 carried by a trunnion member 54. The trunnion member 54 is carried by a rockshaft 55 by means of a pin 56 for rocking movement about the axis of the pin which is retained in place by a clip 57. A spring 58 carried by the rockshaft 55 bears against the inner lower portion of the trunnion member 54 and biases the latter to such position that the shift finger 53 is thrust upwardly and is normally maintained in engagement with the slot between lugs 50 and 52 of yoke 43. A second yoke 59 is carried by a second shift rail 60 which is positioned directly below shift rail 44 as may be seen from Fig. 3 and engages the hub of an idler gear 61 which is adapted to be slid into mesh with the gears 28 and 39 to provide reverse drive. The yoke 59 is provided with a pair of lugs 62 and 63 which are disposed in juxtaposition relative to the lugs 50 and 52 respectively to be engaged by the shift finger 53 upon rocking of the trunnion member 54 about the pin 56 in such manner that shift finger 53 is moved downwardly. The trunnion member 54 is rocked about the axis of the pin 56 against the force of the spring 58 by means of a selector finger 64 which may be operated from the manually actuated shift apparatus in any suitable manner, for example, by a Bowden cable or other similar means connected to a lever 64' carried by a shaft 65' as illustrated in Fig. 1.

Rockshaft 55 is rotatably mounted in a pair of bosses 65 and 66 respectively formed in a cover member 67 which is adapted to be fastened over the opening 45 provided in the casing 14. A set screw 68 is provided for retaining the rockshaft 55 against unintentional displacement and a shift lever 69 is non-rotatably secured at 70 to the rockshaft 55 by means of a nut 71. The shift lever 69 may be swung about the axis of the rockshaft 55 under the control of the manually actuated shift mechanism of the vehicle, the connection therebetween being of any suitable type.

Rocking of the rockshaft 55 with the shift finger 53 in the position shown in Figs. 3 and 4 will cause reciprocation of the yoke 43 and shift rail 44 on which the yoke is carried to thereby engage the sleeve H with the clutch teeth 30 of gear 29 or the clutch teeth 39 of the gear teeth 34 as desired. Rocking of the trunnion member 54 about the axis of the pin 56 through manipulation of the selector element 64 to swing the shift finger 53 downwardly thereby to disengage the same from the slot between the lugs 50 and 52 and engage the same in the slot between the lugs 62 and 63 will position the mechanism for shift of the reverse idler gear 61 into mesh with gears 28 and 39 to establish reverse drive setting of the transmission. After the shift finger has been engaged in the slot between the lugs 62 and 63, shift of the gear 61 is accomplished by clockwise rocking of the rockshaft 55 (as viewed in Fig. 1) through manipulation of the shift lever 69, the shift finger 53 engaging the lug 63 of yoke 59 whereby yoke 59, rail 60 and gear 61 are moved rearwardly.

Both rail 44 and rail 60 are provided with depressed portions 72 which cooperate with suitable spring pressed ball detent mechanisms, one of which is shown at 73 for releasably locking the respective rails in their various operative positions. In the embodiment of the invention described herein, the shift mechanism is designed to be used with the conventional type of steering column mounted remote shift mechanism but any other suitable type of shift mechanism may be used. When the steering column mounted type of mechanism is used, it is intended that the rocking of the trunnion member 54 be controlled by corresponding rocking movement of the manually actuated shift lever in a direction parallel to the steering column and that the swinging of the lever 69 be controlled by corresponding swinging movement of the said shift lever about the axis of the steering column or about an axis parallel to the axis of the steering column. Let it be assumed that under such conditions, if the said manually operable shift lever is swung in a counterclockwise direction about the axis of the steering column with the shift lever positioned in its lower path of movement, which would correspond to the position of the trunnion member 54 illustrated in Fig. 3, then the rockshaft 55 will be rotated in a clockwise direction as viewed in Fig. 1 and sleeve H will be shifted rearwardly to clutch with the clutch teeth 35 thereby to set the transmission mechanism for low range speed ratio drive. Clockwise swinging of the manually operable shift lever in its lower path of movement then will shift the sleeve H forwardly to clutch with the clutch teeth 30 of the gear 29 thereby to set the transmission mechanism in high range speed ratio drive. If the manually operable shift lever is rocked upwardly and then swung in a counterclockwise direction, shift finger 53 will be engaged with yoke 59 and the said yoke 59, rail 60 and gear 61 will be shifted rearwardly to set the transmission for reverse drive.

Rail 60 is incapable of forward shifting movement from the neutral position illustrated in Fig. 4 because of the enlarged portion 74 thereof which abuts the end portion 75 of the boss 76 in which the forward ends of the rails 44 and 60 are slidably carried. Therefore, should the driver attempt to swing the manually operable shift lever out of reverse position without first returning the said lever to its low-high path of movement, the lever will stop abruptly at neutral position unless some means is provided for overcoming this difficulty, which is exceedingly disconcerting to a driver accustomed to the conventional three speed and reverse shift.

With the present improved shift mechanism, no such abrupt stoppage of the shift lever will occur. In Fig. 4, it will be noted that the lug 50 is considerably longer than lug 52 and lug 62 is considerably shorter than lug 63. Also lug 62 is provided with a ramp surface 77 which extends forwardly beyond the rear edge of lug 50.

It will be apparent that, with the above described arrangement, movement of the finger 53 toward the left of Fig. 4 (by counterclockwise swinging of the rockshaft 55) with the finger 53 engaged between lugs 62 and 63 (i. e. with the manual lever in its upper path of movement) will cause yoke 43 to be shifted toward the left of Fig. 4 because lug 50 extends downwardly far enough to be engaged by finger 53 even when the latter is in its lower position. As the finger 53 is moved further toward the left, it will engage the ramp 77 and will thereby be forced upwardly because of the stationary position of yoke 59. The shift of the yoke 43 will therefore be continued until high speed ratio position is reached, in which position the finger 53 will be riding on top of the lug 62. During this movement of the finger, the selector element 64 will also be forced upwardly and this motion will be transmitted back through the shift linkage to the hand of the driver who will be apprised of the true position of the gearing.

In other words, with my improved shift mechanism, high speed ratio setting of the transmission will be obtained whenever the rockshaft 55 is swung in a counterclockwise direction regardless of the position of the finger 53, and no shock due to abrupt stoppage of rail 60 will be felt by the driver. Furthermore, the necessity for "feeling" of the manual shift lever through an H-path is obviated.

Obviously, the mechanism is capable of modification to provide for a shift into low speed setting instead of high speed setting when the rockshaft is swung out of reverse setting. Such modification would require only that relative shift positions of the high-low sleeve or of the reverse gear be reversed.

Referring now to Figs. 3 and 5, it will be seen that a recess 78 is provided in the inside of the cover 67 below the boss 66. In this recess is disposed a lever 79 which is fixed on the lower end of the rockshaft 55. The lever 79 has a wedge shaped end portion which is adapted to engage a corresponding depression in a piston 80 carried by a cylinder 81, the latter being pivoted at 84 to the casing 82 fastened by screws 83 to the cover 67. A coil spring 85 carried in the cylinder 81 bears on the under side of the piston 80 and urges the latter against the wedge shaped end of the lever 79.

When the rockshaft 55 is rotated from neutral position in either direction, the spring urged piston 80 assists the movement thereof, the action of the spring 85 being effective as soon as the lever 79 is swung slightly out of neutral position. In other words, an "over center" action is imparted to the lever 72 which materially reduces the manual effort necessary to overcome the resistance encountered by the blockers 46 and 47 upon a shift in high or low range. While the action of the spring 85 tends to oppose a shift to neutral from either high or low setting, this is not a serious defect because the shift from neutral always requires more effort than the shift out of gear because of the pressure which must necessarily be applied to bring the relatively rotating members into synchronism.

It will thus be apparent that I have provided an improved shifting mechanism for transmissions of the automatic or semi-automatic type, although it is obvious that my invention is not limited in its application to the precise transmission mechanism or structure illustrated and described herein for purposes of illustrating the principles involved. Numerous changes will readily occur to those skilled in the art and I do not intend to limit the scope of invention except as set forth in the claims appended hereto.

I claim:

1. In a motor vehicle power transmission having a pair of selectively operable drive control elements, a pair of rails mounted for shifting movement relative to each other along parallel axes, means operably connecting said rails respectively with said drive control elements, a shaft mounted for oscillatory movement about an axis transverse to said parallel axes, a selector element carried by said shaft for swinging relative thereto about an axis transverse to the axis of oscillation thereof, a shift finger carried by said element for selectively engaging said rails in response to swinging of said element, means for swinging said element, means for oscillating said shaft, a lever carried by said shaft and over center spring means associated with said lever for assisting oscillation thereof.

2. In a change speed transmission, a casing, a rockshaft, means associated with said rockshaft for effecting speed ratio changes in response to rocking thereof, a cylinder pivotally mounted in said casing, a piston in said cylinder, means for urging said piston outwardly of said cylinder, a lever carried by said rockshaft having a wedge-shaped end in engagement with said piston, said piston and lever being so disposed that said piston exerts no turning force on said rockshaft while the latter is in neutral position but is effective upon initial rocking of said shaft in either direction.

3. In a change speed transmission, a first shift yoke adapted to be shifted in opposite directions from neutral for selectively establishing a pair of speed ratio drives; a second shift yoke adapted to be shifted in one direction only from neutral for establishing a third speed ratio drive; a selector and shift element adapted for movement in parallel paths for shifting said yokes; a pair of lugs on each of said yokes forming slots for receiving said element; one of the lugs on said second yoke having an inclined wall adapted for engagement by said element for camming the latter out of engagement with said second yoke and into the slot of said first yoke in response to movement of said element in a direction opposite to the shift-establishing movement thereof when engaged with said second yoke.

4. In a change speed transmission, a first shift yoke adapted to be shifted in opposite directions from neutral for selectively establishing a pair of speed ratio drives; a second shift yoke adapted to be shifted in one direction only from neutral for establishing a third speed ratio drive; a selector and shift element adapted for movement in parallel paths for shifting said yokes; a pair of lugs on each of said yokes forming slots for receiving said element; one of the lugs on said second yoke having an inclined wall adapted for engagement by said element for camming the latter out of engagement with said second yoke and into the slot of said first yoke in response to movement of said element in a direction opposite to the shift-establishing movement thereof when engaged with said second yoke; the juxtapositioned lug of said first yoke being elongated for facilitating engagement of said element with the slot of said yoke.

OTTO E. FISHBURN.